Jan. 1, 1924

G. A. ODDSEN

CUT-OFF TOOL HOLDER

Filed July 25, 1922

G. A. Oddsen
Inventor

By Clarence A. O'Brien
Attorney

WITNESSES
N. Berman
H. A. LaClair

Jan. 1, 1924. 1,479,203
G. A. ODDSEN
CUT-OFF TOOL HOLDER
Filed July 25, 1922  3 Sheets-Sheet 2
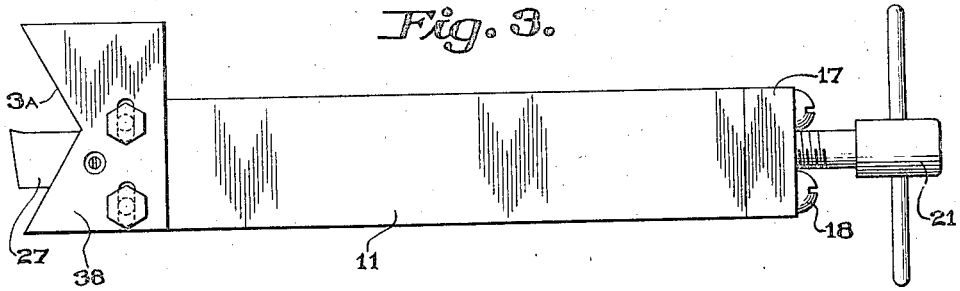
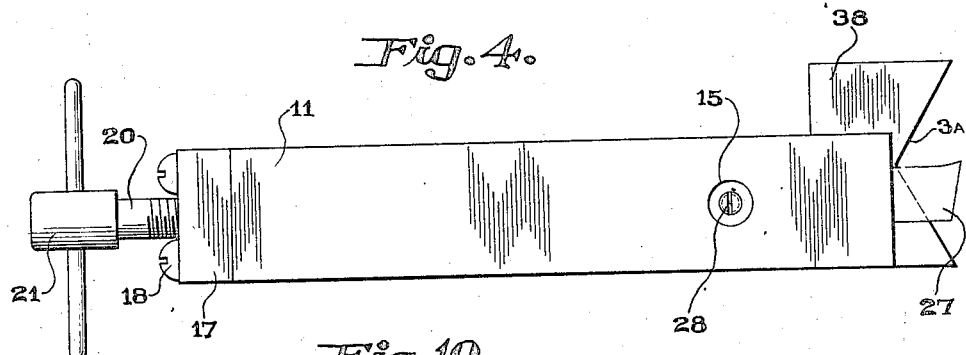
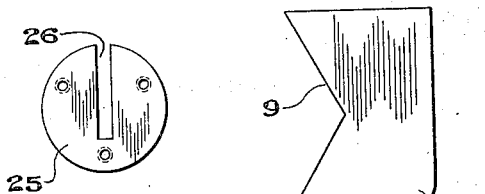
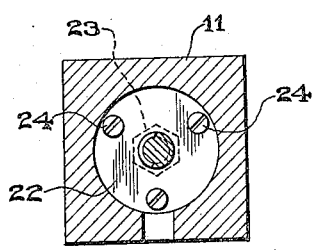
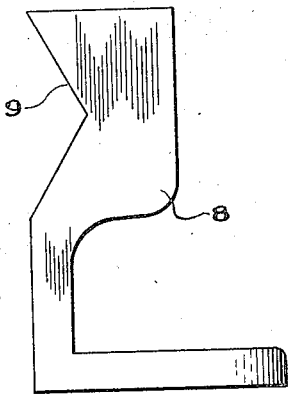
G. A. Oddsen
Inventor
N. Berman
H. A. LaClair
WITNESSES.
By Clarence A. O'Brien
Attorney Jan. 1, 1924
G. A. ODDSEN
CUT-OFF TOOL HOLDER
Filed July 25, 1922
1,479,203
3 Sheets-Sheet 3
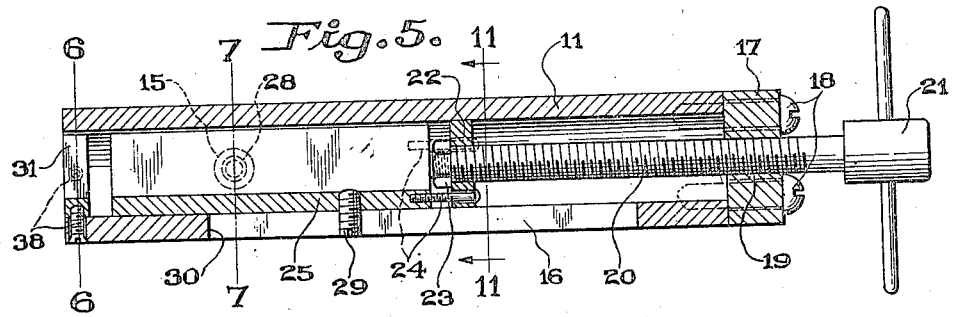
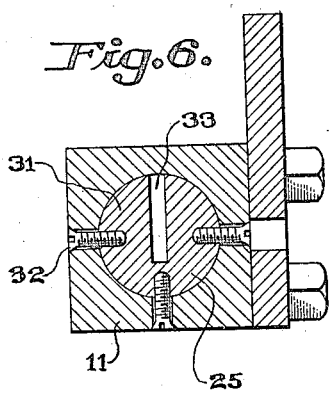
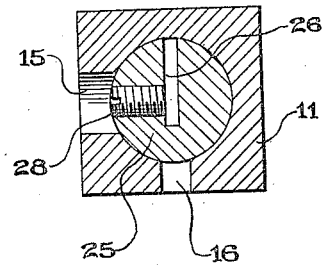
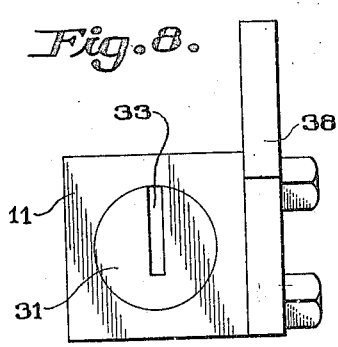
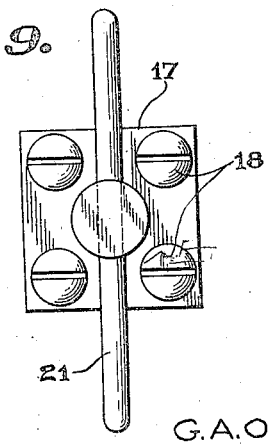
G. A. Oddsen
Inventor
By Clarence A. O'Brien
Attorney
N. Berman
H. A. LaClair
WITNESSES Patented Jan. 1, 1924.

1,479,203

UNITED STATES PATENT OFFICE.

GUSTAV ADOLF ODDSEN, OF BROOKLYN, NEW YORK.

CUT-OFF-TOOL HOLDER.

Application filed July 25, 1922. Serial No. 577,487.

*To all whom it may concern:*

Be it known that I, GUSTAV A. ODDSEN, a subject of the King of Norway, residing at Brooklyn, in the county of Kings and State of New York, have invented new and useful Improvements in Cut-Off-Tool Holders, of which the following is a specification.

The object of my said invention is the provision of a cut-off tool holder characterized by capacity to prevent chattering and breakage of cut off tools while assuring the expeditious production of substantially perfect work.

To the attainment of the foregoing, the invention consists in the improvement as hereinafter described and definitely claimed.

In the accompanying drawings, forming part of this specification:—

Figure 3 is an enlarged detail side elevation of the cut-off tool holder.

Figure 4 is a similar view of the opposite side thereof.

Figure 5 is a longitudinal vertical central section taken through the tool holder.

Figure 1:
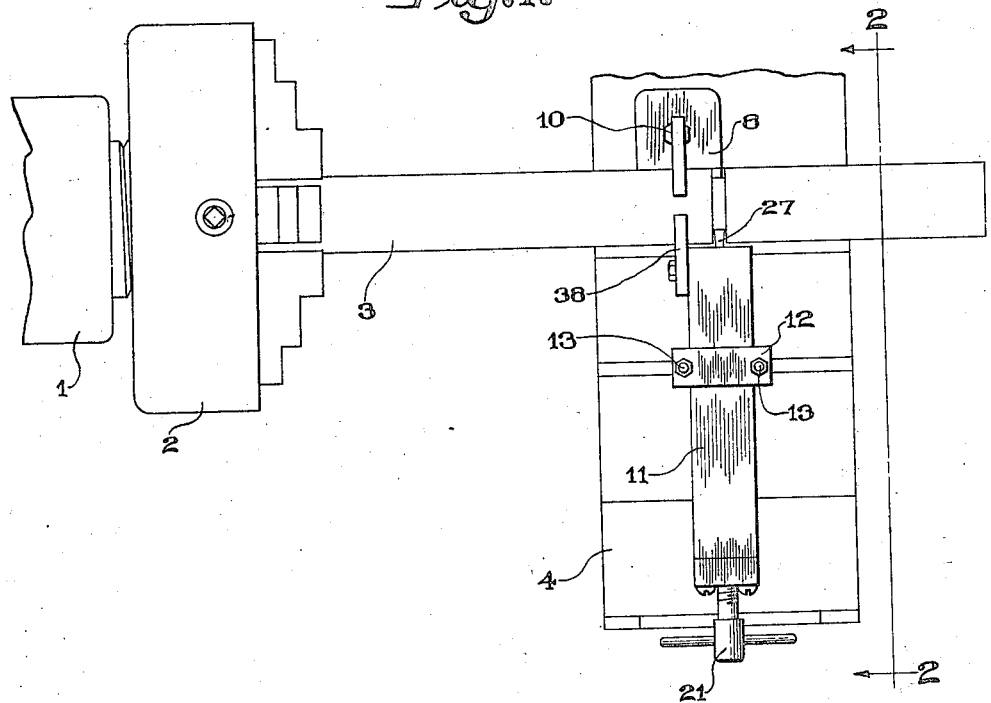
Figure 1 is a plan view illustrating my improvement in operation.

Figures 6 and 7 are transverse sections taken in the planes indicated by the lines 6—6 and 7—7, respectively, of Figure 5.

Figure 8 is an enlarged front end elevation of the tool holder.

Figure 9 is a rear end elevation thereof.

Figure 10 is a rear end elevation of the adjustable tool carrier.

Figure 11 is an enlarged transverse section taken in the plane indicated by the line 11—11 of Figure 5.

Figure 12 is an enlarged detail side elevation of the plate on the cross slide.

Similar numerals of reference designate corresponding parts in all of the views of the drawings.

In association with my novel cut-off tool holder I employ a lathe head 1 and a chuck 2, and in the said chuck I illustrate a piece of stock 3 that is to be cut off. I also associate with my improvement a cross slide 4, appropriate means 5 for the adjustment of said cross slide, a compound 6, appropriate means 7 to adjust the said compound, and a plate 8, the said plate being recessed at 9 to receive and brace the piece of stock 3 and tend to prevent upward and downward deflection thereof, and being carried by the cross slide 4 to which it is fixedly connected as indicated by 10.

Figure 2:
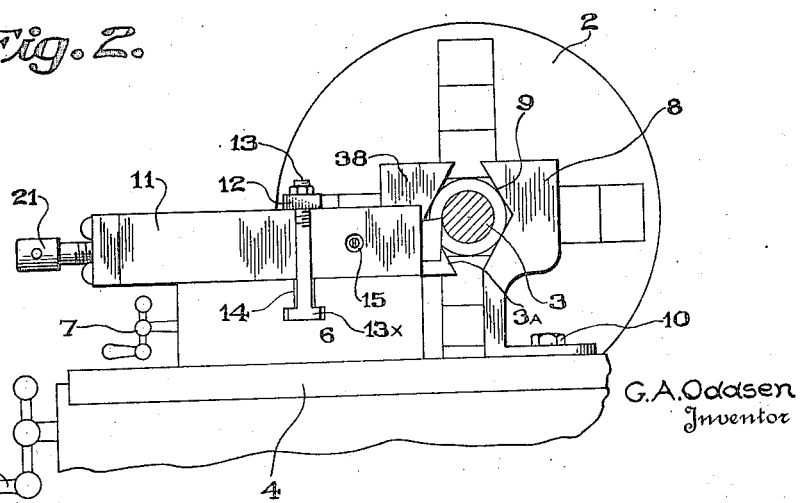
Figure 2 is a vertical section taken in the plane indicated by the line 2—2 of Figure 1.

My novel cut-off tool holder includes among other elements a holder body 11, and the said body 11 is preferably connected with the compound 6 in the manner illustrated—i. e., through the medium of a cross bar 12 disposed above the body 11, and bolts 13 connected to the said cross bar 12 and having T-heads 13× disposed in a correspondingly shaped cross cross slot 14 in the compound, Figure 2. In one side of the body 11 is a recess or opening 15 which communicates with the interior of the said body, and in the bottom of the body is a longitudinal slot 16. At the rear end of the body 11 a head 17 is connected thereto through the medium of screws 18, and the said head 17 is provided with a longitudinal central threaded aperture 19, the said aperture 19 being for the reception and engagement of the screw 20 on the rear end of which is an appropriate handle 21. The interior of the body 11 is of circular form in cross section, Figures 6, 7, 8 and 11, and swivelled on the forward portion of the screw 20 is a disk 22 which is held on the screw by a nut 23 and is connected by screws 24 with the rear end of a slidable tool carrier 25. The said tool carrier 25 is of circular form in cross-section and is longitudinally kerfed as indicated by 26 to receive the cutting off tool which is designated by 27. The said tool carrier 25 is equipped at 28 with a set screw designed to secure the tool 27 in the kerf 26, and manifestly when the said screw 28 is coincident with the opening 15 as appears in Figure 7 the screw may be taken or loosened through the medium of an ordinary screw driver. It will also be noted that the carrier 25 is provided with a screw or any other appropriate projection 29 which is movable in the slot 16 and is adapted to prevent turning of the carrier about its axis when the tool is removed from the carrier. It will also be noticed by comparison of Figures 5 and 6 that the body 11 is provided in its forward end with a disk 31, secured by three screws 32 and kerfed as indicated by 33 to guide and brace the tool 27 incident to the translation thereof. Carried by the forward portion of the body 11 at one side of the said body and alined with the plate 8 is a plate 38, recessed at 3ª and adapted to serve in conjunction with the plate 8 in bracing the piece of stock and in tending to prevent lateral deflection of the piece of stock incident to the cutting off operation.

In the practical use of my improvement the cross slide 4 is retracted to position the plate 8 against one side of the piece of stock, and the compound is moved inwardly to set the plate 38 against the opposite side of the piece of stock. Then as the piece of stock is rotated about its axis and the cutting off operation is started, the screw 20 is manipulated to gradually feed the carrier 25 and the tool 27 forwardly in the holder. In this connection it will be observed that the stock rotates in the upper groove or recess of the plate 38, and the cutting off tool protrudes from the holder when the screw 20 is rotated in proper direction. From this it follows that the stock cannot spring over the tool, and in consequence a fast feed can be made use of and production expedited.

The plate or stop piece 8 can be adjusted for any size of work by adjusting the cross slide 4 inwardly and outwardly, and reversely adjusting the compound 6.

The cross slide 4 does not move while the cutting off operation is proceeding. This obviates the necessity of moving a steady rest for every few pieces that are cut, and for much work there is no necessity of employing a steady rest.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of the invention defined in my appended claims.

Having described my invention, what I claim and desire to secure by Letters-Patent, is:—

1. In means for the purpose described, the combination of a cross slide, means to adjust the same, a compound adjustable on the cross slide, means to adjust the compound, a cut-off tool holder mounted on the compound and comprising a body, a tool carrier movable rectilinearly in the body, means to adjust the carrier in and relative to the body, work-engaging means carried by the body, and work-engaging means adapted to be arranged at the opposite side of stock or work with reference to the first-named work-engaging means; the tool-carrier being kerfed to receive a cut-off tool and being provided with a tool engaging set screw adapted to be registered with an opening in the side of the body.

2. In means for the purpose described, the combination of a cross slide, means to adjust the same, a compound adjustable on the cross slide, means to adjust the compound, a cut-off tool holder mounted on the compound and comprising a body, a tool carrier movable rectilinearly in the body, means to adjust the carrier in and relative to the body, a kerfed disk fixed in the forward end portion of the body and through which the cut-off tool is fed, work-engaging means carried by the body, and work-engaging means adapted to be arranged at the opposite side of stock or work with reference to the first-named work-engaging means.

3. In means for the purpose described, the combination of a cross slide, means to adjust the same, a compound adjustable on the cross slide, means to adjust the compound, a cut-off tool holder mounted on the compound and comprising a body, a tool carrier movable rectilinearly in the body, means to adjust the carrier in and relative to the body, work-engaging means carried by the body, and work-engaging means adapted to body, and work-engaging means adapted to be arranged at the opposite side of stock or work with reference to the first-named work-engaging means; the said means for adjusting the tool carrier in the holder body being in the form of a longitudinal screw bearing in the rear portion of the body and connected to the carrier and equipped in rear of the body with a handle.

In testimony whereof, I affix my signature.

GUSTAV ADOLF ODDSEN.